United States Patent [19]

Sekiguchi

[11] Patent Number: 4,984,511
[45] Date of Patent: Jan. 15, 1991

[54] BEVERAGE BREWING APPARATUS FOR VENDING MACHINES

[75] Inventor: Ryoichi Sekiguchi, Isesaki, Japan

[73] Assignee: Sanden Corporation, Japan

[21] Appl. No.: 441,480

[22] Filed: Nov. 27, 1989

[30] Foreign Application Priority Data

Nov. 25, 1988 [JP] Japan ............................ 63-152394[U]
Nov. 25, 1988 [JP] Japan ............................ 63-152396[U]
Nov. 25, 1988 [JP] Japan ............................ 63-152397[U]
Nov. 25, 1988 [JP] Japan ............................ 63-152398[U]

[51] Int. Cl.[5] ............................................. A47J 31/32
[52] U.S. Cl. .................................... 99/287; 99/289 T; 99/302 R
[58] Field of Search ................ 99/275, 279, 286, 287, 99/289 R, 289 T, 292, 298, 300, 302 R, 304, 307, 316, 323.1, 323.3; 426/433

[56] References Cited

U.S. PATENT DOCUMENTS

| | | | |
|---|---|---|---|
| 3,292,526 | 12/1966 | Heier | 99/289 |
| 3,349,690 | 10/1967 | Heier | 99/283 |
| 4,271,752 | 6/1981 | Valente et al. | 99/289 |
| 4,271,753 | 6/1981 | Neely | 99/289 |
| 4,357,861 | 11/1982 | Girolamo | 99/289 R |
| 4,506,596 | 3/1985 | Shigenobu et al. | 99/289 |
| 4,612,850 | 9/1986 | Kanazashi et al. | 99/289 |
| 4,648,313 | 3/1987 | Kokubun et al. | 99/289 |
| 4,667,585 | 5/1987 | Harashima et al. | 99/289 |
| 4,667,586 | 5/1987 | Harada et al. | 99/289 |
| 4,669,372 | 6/1987 | Harada | 99/289 |
| 4,715,270 | 12/1987 | Harada | 99/289 |

FOREIGN PATENT DOCUMENTS 61-151681 9/1987 Japan .

Primary Examiner—Robert W. Jenkins
Attorney, Agent, or Firm—Banner, Birch, McKie & Beckett

[57] ABSTRACT

A beverage extracting or brewing apparatus for vending machines includes a mixing ball for mixing water and raw material of a beverage, a cylinder having a spherical upper inner surface, a straight cylindrical communication path between the mixing ball and the cylinder having a flush inner surface, a valve opening and closing an inflow port of the cylinder and having a spherical upper surface, a valve shaft functioning as part of a pressurized air supply path into the cylinder, a filter positioned at the bottom of the cylinder and a pressurization device for supplying the pressurized air into the cylinder to forcibly filter the mixture liquid in the cylinder through the filter. The mixture liquid from the mixing ball can be sufficiently and efficiently mixed and stirred in the communication path and even in the cylinder, and smoothly flows into the cylinder through the space between the spherical inner surface of the cylinder and the spherical upper surface of the valve. The mixture liquid does not stick to various portions in the apparatus, thereby maintaining the apparatus sanitary. Since the mixture liquid is sufficiently and quickly mixed before being extracted, the processing time of the beverage of the vending machine is significantly reduced.

22 Claims, 8 Drawing Sheets

FIG. I

BEVERAGE BREWING APPARATUS FOR VENDING MACHINES

BACKGROUND OF THE INVENTION

1. Field of the Invention

The present invention relates to a beverage extracting apparatus for vending machines which mixes water and raw beverage material, filters or filtrates the mixture liquid via a filter and extracts the filtered mixture liquid.

2. Description of the Prior Art

A conventional beverage extracting apparatus for vending machines is shown in FIG. 10 (Japanese Utility Model Publication No. SHO 62-151681). A mixing chamber or ball 1 thereof mixes supplied water, for example hot water, and supplied raw beverage material, for example ground coffee. A mixture liquid 2 of the water and the raw material is introduced into a cylinder 3 through an outflow port 1a of mixing ball 1, a communication path 4 and an inflow port 3a of the cylinder, when a valve 5 opens. The valve is driven by a valve drive mechanism (not shown). After mixture liquid 2 is introduced into cylinder 3, valve 5 is closed and pressurized air is supplied into the cylinder via an air pipe 6. The mixture liquid 2 in cylinder 3 is forcibly filtered and extracted by the pressure of the supplied pressurized air via a filter 7 covering a bottom opening 3b of cylinder 3.

In such a conventional apparatus, the upper and lower end portions of communication path 4 extend vertically, and the portion between the upper and lower end portions extends at a slant. Therefore, the communication path 4 has flexed portions 4a and 4b on the upper and lower portions thereof, respectively. When mixture liquid 2 is introduced from mixing ball 1 into cylinder 3 through this communication path 4 as shown by arrows in FIG. 10, the mixture liquid impacts the inner surface of the communication path at the areas of flexed portions 4a and 4b. As a result, mixture liquid 2 cannot flow smoothly through communication path 4 and some of the raw material 8 (for example, coffee powder) of the mixture liquid sticks to the inner surface at the flexed portions. If this raw material 8 stuck to the inner surface of communication path 4 is not quickly removed, mold can form which makes for an unsanitary condition.

The mixture liquid flowing out of mixing ball 1 into communication path 4 flows generally in a swirling, whirlpool or vortex type of flow. However, this flow of the mixture liquid is interrupted at the areas of flexed portions 4a and 4b, and the water and the raw material are thus not uniformly mixed. Thus, in this conventional apparatus, pressurized air is supplied to cylinder 3 thereby stirring the mixture liquid in the cylinder, and thereafter, the mixture liquid is sent to a subsequent process in the vending machine. This stirring procedure in the cylinder 3 disadvantageously adds to the total-brewing time of the vending machine.

Further in the conventional apparatus shown in FIG. 10, since an upper inner surface 3c of cylinder 3 is formed as a horizontal flat surface and an upper surface 5a of valve 5 is formed as a trapezoidal surface including a horizontal flat top surface 5b, the mixture liquid from mixing ball 1 falls onto upper surface 5a of valve 5 and into cylinder 3 from the periphery of the upper surface of the valve. At that time, the falling mixture liquid impacts filter 7 or the mixture liquid already in cylinder 3, some of the mixture liquid thereby is scattered in the cylinder, and some of the scattered mixture liquid sticks to the inner surface of the cylinder above the liquid level 2a of the mixture liquid to be stored in the cylinder. This mixture liquid sticking to the inner surface of cylinder 3 and/or the mixture liquid remaining on the upper surface 5a of valve 5 is not filtered. If this remaining mixture liquid is not soon removed, it gets moldy and this is unsanitary.

Moreover, since the mixture liquid merely falls into cylinder 3 from the periphery of valve 5, the stirring action of the mixture liquid in the cylinder is not sufficient. Pressurized air supplied into cylinder 3 is needed to stir the mixture liquid in the cylinder, thereby extending the sale time of the vending machine.

Furthermore, in the conventional apparatus, since an air inlet port 3d connected to air pipe 6 is formed on the side wall of cylinder 3 at a position lower than liquid level 2a, the mixture liquid stored in the cylinder can flow towards the pressurized air supply means through the air pipe. To prevent this flow, a check valve (not shown) is provided on air pipe 6 or on another portion on the air supply path.

Moreover, in the conventional apparatus, since the pressurized air supplied from air inlet port 3d into cylinder 3 bubbles and the bubbles rise along the side wall of the cylinder as shown in FIG. 10, it is primarily only the mixture liquid adjacent the side wall on the side provided with the air inlet port which is stirred by the bubbles. Thus all of the mixture liquid in cylinder 3 cannot be sufficiently stirred. Also, when the bubbles of the pressurized air break or pop at the liquid level 2a near the side wall of cylinder 3, some of the mixture liquid is scattered by the breaking bubbles and the scattered mixture liquid sticks to the inner surface of the side wall. If this mixture liquid on the side wall remains for any length of time, it can also get moldy.

SUMMARY OF THE INVENTION

Accordingly, an object of the present invention is to provide a beverage extracting apparatus for vending machines which prevents the raw beverage material from sticking to the inner surface of a communication path between the mixing ball and the cylinder, thereby maintaining the apparatus sanitary, and which can sufficiently mix water and the raw material before the mixture liquid flows out from the communication path, thereby significantly shortening the time for mixing and stirring the mixture liquid.

Another object of the present invention is to provide a beverage extracting apparatus for vending machines which prevents the mixture liquid from sticking to the upper inner surface of a cylinder and the upper surface of a valve, thereby maintaining the apparatus sanitary, and which can sufficiently mix and stir the mixture liquid even in the cylinder, thereby shortening the time for the mixing and stirring.

A further object of the present invention is to provide a beverage extracting apparatus for vending machines which prevents the mixture liquid from flowing into the pressurized air supply path and therein a check valve is not needed on the air supply path, thereby simplifying the structure of the apparatus and reducing the production costs thereof.

A still further object of the present invention is to provide a beverage extracting apparatus for vending machines which can efficiently, quickly and uniformly mix and stir the mixture liquid in a cylinder, and which prevents any of the mixture liquid from scattering toward the inner side surface of the cylinder, thereby maintaining the apparatus sanitary.

Directed to achieving these objects, the present invention provides the following beverage extracting apparatuses for vending machines.

A first beverage extracting apparatus for vending machines according to the present invention comprises:

a mixing ball mixing supplied water and raw material of a beverage to make a mixture liquid of the water and raw material, the mixing ball having an outflow port for discharging the mixture liquid;

a cylinder positioned below the mixing ball and into which the mixture liquid from the mixing ball is introduced through an inflow port on the upper portion of the cylinder;

a path communicating the outflow port of the mixing ball and the inflow port of the cylinder for introducing the mixture liquid from the mixing ball into the cylinder, the communication path being circular in cross section, the communication path extending straight between and connecting the outflow port and the inflow port, the inner surface of the communication path being formed flush in the extending direction of the communication path;

a valve means for opening and closing the inflow port of the cylinder;

a filter means for covering a bottom opening of the cylinder; and a pressurization means for supplying pressurized air into the cylinder when the inflow port is closed by the valve means and forcibly filtering the mixture liquid in the cylinder by the pressure of the supplied pressurized air via the filter means.

A second beverage extracting apparatus for vending machines according to the present invention comprises:

a mixing ball mixing supplied water and raw material of a beverage to make a mixture liquid of the water and raw material;

a cylinder positioned below the mixing ball and into which the mixture liquid from the mixing ball is introduced through an inflow port on the upper portion of the cylinder, the cylinder having its upper inner surface formed as a spherical surface;

a valve means for opening and closing the inflow port of the cylinder, the valve means having a spherical surface extending along the spherical surface of the cylinder;

a filter means for covering a bottom opening of the cylinder; and a pressurization means for supplying pressurized air into the cylinder when the inflow port is closed by the valve means and forcibly filtering the mixture liquid in the cylinder by the pressure of the supplied pressurized air through the filter means.

A third beverage extracting apparatus for vending machines according to the present invention comprises:

a mixing ball mixing supplied water and raw material of a beverage for making a mixture liquid of the water and raw material;

a cylinder positioned below the mixing ball and into which the mixture liquid from the mixing ball is introduced through an inflow port on the upper portion of the cylinder;

a valve means for opening and closing the inflow port of the cylinder;

a valve shaft connected to the valve means and extending vertically through the valve means, the valve shaft being formed as a pipe;

a valve drive means for driving the valve means via the valve shaft, a filter means for covering a bottom opening of the cylinder; and a pressurization means for supplying pressurized air into the cylinder through the hollow portion of the valve shaft when the inflow port is closed by the valve means and forcibly filtering the mixture liquid in the cylinder by the pressure of the supplied pressurized air through the filter means.

In the first beverage extracting apparatus, since the communication path extends straight between the outflow port of the mixing ball and the inflow port of the cylinder to interconnect the outflow and inflow ports and the inner surface of the communication path is formed as a flush surface, the flow of the mixture liquid in the communication path is not obstructed. Therefore, the vortex flow of the mixture liquid generated in the mixing ball is sufficiently maintained even in the communication path and the mixture liquid flows smoothly through the communication path into the cylinder. Since the mixture liquid is sufficiently mixed and stirred by its vortex flow before reaching the cylinder, it is not necessary to stir the mixture liquid in the cylinder and the time for stirring the mixture liquid in the cylinder is shortened, thereby significantly shortening the sale time for the vending machine. Also, since there is no flexed or angular portions in the communication path and the mixture liquid smoothly flows in the communication path with a vortex flow, the raw material does not stick to the inner surface of the communication path, thereby maintaining the path sanitary.

In the second beverage extracting apparatus, the mixture liquid from the mixing ball flows into the cylinder through the space between the spherical surface of the upper inner surface of the cylinder and the spherical upper surface of the valve means and flows down along the inner side surface of the side wall of the cylinder. The mixture liquid is thereby prevented from sticking to the spherical surfaces and the mixture liquid is prevented from scattering and sticking to the inner surface of the cylinder when the mixture liquid drops down into the cylinder, thereby maintaining the inner surface of the cylinder and the upper surface of the valve means sanitary. Also, since the mixture liquid flowing down along the inner side surface of the side wall of the cylinder flows from the portion near the side wall into the mixture liquid in the cylinder, a vertical convective flow is generated in the stored and flowing-in mixture liquid in the cylinder. The mixture liquid in the cylinder is naturally and sufficiently stirred by the convective flow, thereby shortening the time for the stirring in the cylinder and significantly shortening the sale time for the vending machine.

In the third beverage extracting apparatus, the vertical valve shaft constitutes a part of the pressurized air path, and the pressurized air is supplied through only the hollow portion of the valve shaft from the upper side of the cylinder into the cylinder. Therefore, an air inlet port on the side wall of the cylinder is not needed, the mixture liquid in the cylinder does not flow into the air supply path and a check valve on the air supply path is not needed, thereby simplifying the structure of the air supply path and reducing the production costs.

When the valve shaft extends down to a position below the liquid level of the mixture liquid stored in the cylinder at or near the axis of the cylinder, the bubbles of the pressurized air supplied through the valve shaft rise in the mixture liquid stored in the cylinder at the central portion of the cylinder. Therefore, the entire mixture liquid in the cylinder can be uniformly and efficiently stirred by the bubbles, thereby significantly shortening the stirring time. Moreover, even if the bubbles break on the liquid level of the mixture liquid and some of the mixture liquid is scattered by the breakage of the bubbles, the scattered mixture liquid does not reach the inner surface of the cylinder because the bubbles break far from the inner surface, thereby maintaining the inner surface sanitary.

BRIEF DESCRIPTION OF THE DRAWINGS

Preferred exemplary embodiments of the present invention will now be described with reference to the accompanying drawings which are given by way of example only.

DETAILED DESCRIPTION OF PREFERRED EMBODIMENTS OF THE PRESENT INVENTION

Figure 1:
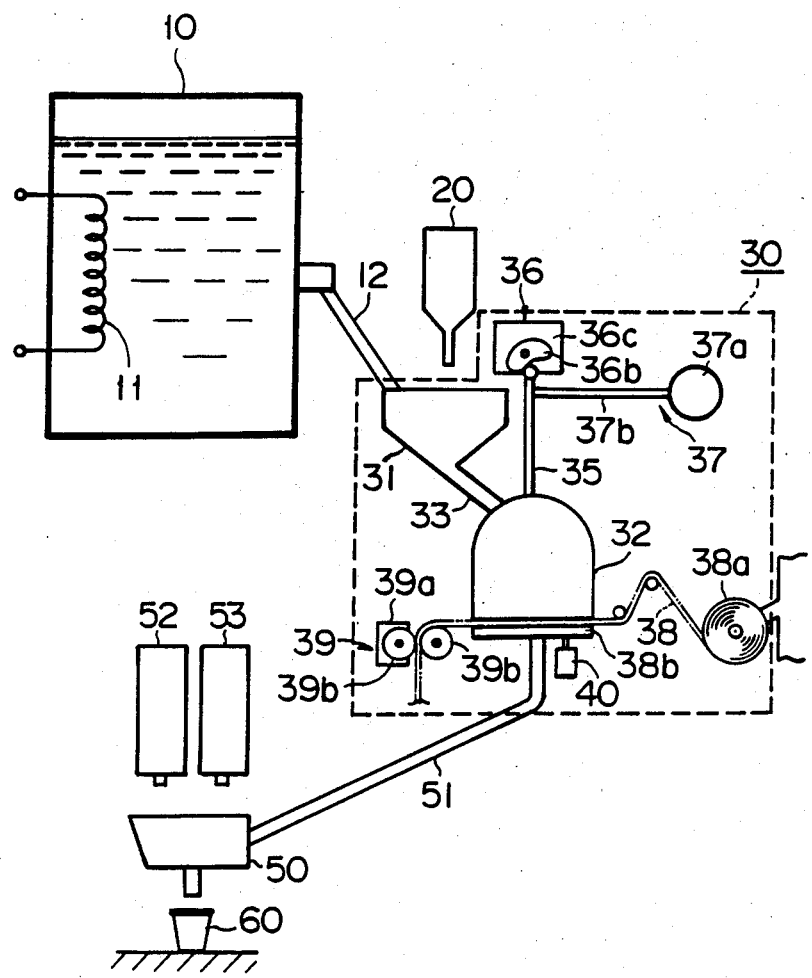
FIG. 1 is a schematic view of a vending machine including a beverage extracting apparatus according to an embodiment of the present invention.
Figure 2:
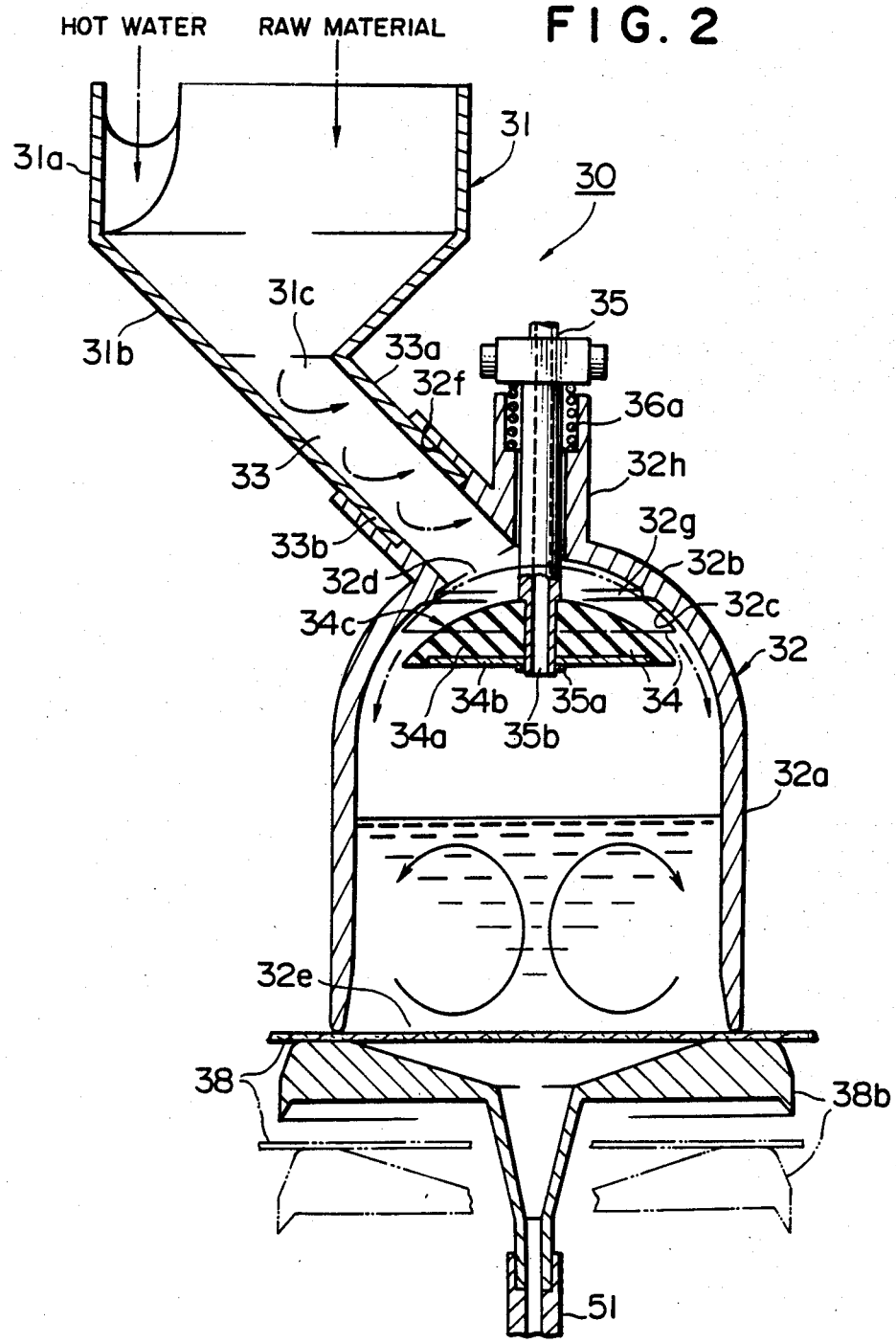
FIG. 2 is an enlarged vertical sectional view of a main portion of the beverage extracting apparatus shown in FIG. 1.
Figure 3:
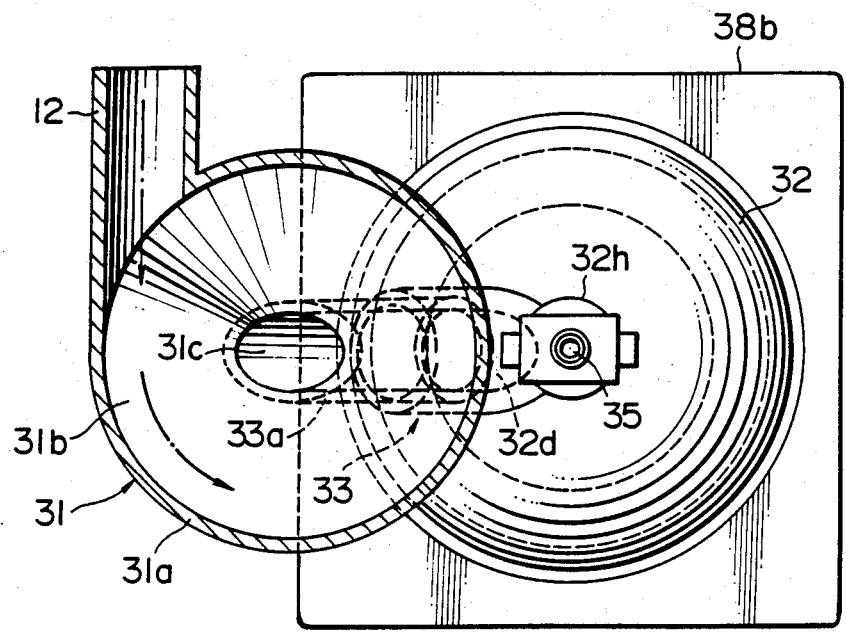
FIG. 3 is a plan view of the beverage extracting apparatus shown in FIG. 2.

Referring to the drawings, FIGS. 1 to 3 illustrate a beverage extracting apparatus for vending machines according to a first embodiment of the present invention. FIG. 1 shows a schematic structure of a vending machine for selling a beverage, such as coffee. A hot water (water) storing tank 10 stores hot water heated by a heater 11. A milling device 20 mills or grinds raw material, such as coffee beans, of a beverage to raw powder, such as ground coffee. A beverage extracting apparatus 30 mixes and stirs the hot water supplied from hot water storing tank 10 through a hot water supply pipe 12 and the raw powder supplied from milling device 20, and extracts a liquid for the beverage (for example, coffee liquid) from the mixture liquid of the hot water and the raw powder. The extracted liquid is sent to a mixing box 50 through an extracted liquid delivering pipe 51, and in this embodiment, after the sugar from a sugar box 52 and the cream from a cream box 53 are added to the liquid in the mixing box, the liquid is poured into a cup 60 as a beverage to be sold.

FIGS. 2 and 3 show the main part of beverage extracting apparatus 30. As shown therein a mixing ball 31 comprising a cylindrical side wall 31a and a conical bottom wall 31b has an outflow port 31c on the central portion of the bottom wall. Hot water supply pipe 12 is connected to side wall 31a to tangentially introduce the hot water from hot water storing tank 10 into the inside space of mixing ball 31. The introduced hot water forms a vortex flow in mixing ball 31. The raw powder from milling device 20 is deposited into mixing ball 31 through the upper opening of the mixing ball, and the deposited raw powder is mixed with the hot water forming the vortex flow in the mixing ball.

The cylinder 32 has a cylindrical side wall 32a and a spherical upper wall 32b. The upper inner surface of cylinder 32 is formed as a spherical surface 32c. Cylinder 32 has an inflow port 32d for the mixture liquid sent from mixing ball 31 on the upper portion thereof and an opening 32e on the bottom portion thereof. This cylinder 32 is constructed from a resin to constitute a pressure-proof structure.

Outflow port 31c of mixing ball 31 and inflow port 32d of cylinder 32 are connected by a communication path 33. Communication path 33 is formed by a main pipe portion 33a connected to outflow port 31c and extending downwardly and at a slant and a joint portion 33b connected to inflow port 32d and fitted into a notched portion 32f formed on the inner surface of the inflow port. The cross section of communication path 33 is circular over its entire length. Communication path 33 extends straight between and interconnecting outflow port 31c and inflow port 32d. Moreover, the inner surface of the communication path is formed to be flush in the extending direction of the communication path, and the inner diameter of the communication path is constant over its entire length.

Inflow port 32d of cylinder 32 is opened and closed by a valve 34 comprising a rubber valve body 34a and an attachment plate 34b. Valve 34 is seated on a valve seat 32g which is formed on spherical inner surface 32c of cylinder 32 and extends circumferentially with respect to the cylinder. The upper surface of valve 34 is formed as a spherical surface 34c extending along spherical inner surface 32c of cylinder 32.

Valve 34 is driven by a valve drive mechanism 36 via a valve shaft 35 which extends vertically through a valve shaft guide 32h formed on the top portion of cylinder 32 and through the valve. The bottom portion of valve shaft 35 is connected to attachment plate 34b of valve 34 via E-ring 35a. Valve shaft 35 consists of a pipe and has a hollow portion therein and an opening 35b on its bottom portion. Valve drive mechanism 36 comprises a spring 36a disposed in valve shaft guide 32h and upwardly urging valve shaft 35, a cam 36b (FIG. 1) vertically driving the valve shaft by its rotation and a motor 36c (FIG. 1) driving the cam. Valve 34 normally closes inflow port 32d of cylinder 32 as it is urged upwardly by spring 36a via valve shaft 35 and seated on valve seat 32g. When motor 36c is driven and cam 36b is rotated, valve 34 is moved downwardly together with valve shaft 35 and the valve opens inflow port 32d. At that time, an appropriately small clearance is defined between spherical inner surface 32c of cylinder 32 and spherical upper surface 34c of valve 34 facing each other.

A pressurization means 37 for supplying pressurized air into cylinder 32 when inflow port 32d is closed comprises an air pump 37a generating pressurized air, an air pipe 37b connected to the air pump and valve shaft 35. The pressurized air generated by air pump 37a is introduced into cylinder 32 through air pipe 37b and the hollow portion of valve shaft 35.

A filter 38 covers bottom opening 32e of cylinder 32 and is constructed as a continuous filter sheet. The filter 38 which is unwound from a filter package 38a is sent at an appropriate interval onto a filter block 38b by drawing the filter by a filter drive means 39 comprising a motor 39a and a pair of nip rollers 39b. Filter block 38b is vertically driven by a solenoid 40, and the inside space of the filter block communicates with extracted liquid delivering pipe 51.

In the above-described vending machine, a predetermined volume of hot water is introduced from hot water storing tank 10 into mixing ball 31 through hot water supply pipe 12 and a predetermined amount of raw powder (ground coffee) is deposited from milling device 20 into the mixing ball. The hot water is tangentially introduced into mixing ball 31 and flows along the inner surface of the mixing ball in the circumferential direction thereof as shown by the arrow in FIG. 3, and a vortex flow of the hot water is formed in the mixing ball. The raw powder is deposited into the vortex flow of the hot water and mixed with the hot water, and the mixture liquid is stirred by this flow.

As the mixture liquid is being mixed in mixing ball 31, valve 34 is moved down by driving valve shaft 35 by valve drive mechanism 36 and inflow port 32d of cylinder 32 is opened. The mixture liquid in mixing ball 31 flows into cylinder 32 through communication path 33. Since communication path 33 extends straight to communicate outflow port 31c of mixing ball 31 and inflow port 32d of cylinder 32, the communication path is circular in cross section and the inner surface of the communication path is formed to be flush over the entire length, the mixture liquid is maintained its vortex flow state along the communication path as well as shown by arrows in FIG. 2, and the mixture liquid flows into cylinder maintaining the vortex flow. Therefore, the hot water and the raw powder are sufficiently mixed even in communication path 33 and the mixture liquid is sufficiently stirred in the communication path. Moreover, since there is no flexed or angular portion in communication path 33, the raw powder does not stick to the inner surface of the communication path, thereby maintaining the inner surface sanitary.

Figure 4:
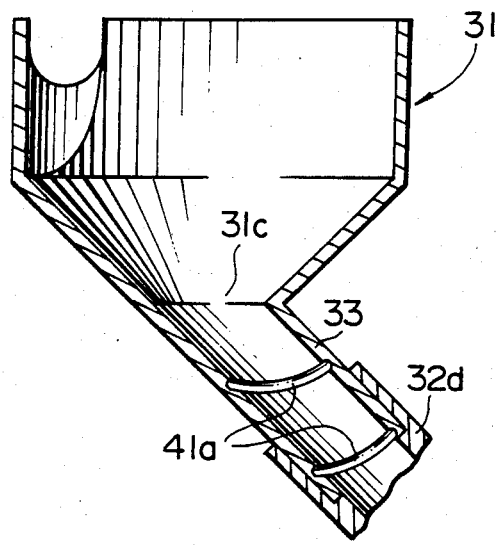
FIG. 4 is a vertical sectional view showing a modified communication path of the beverage extracting apparatus shown in FIG. 2.
Figure 5:
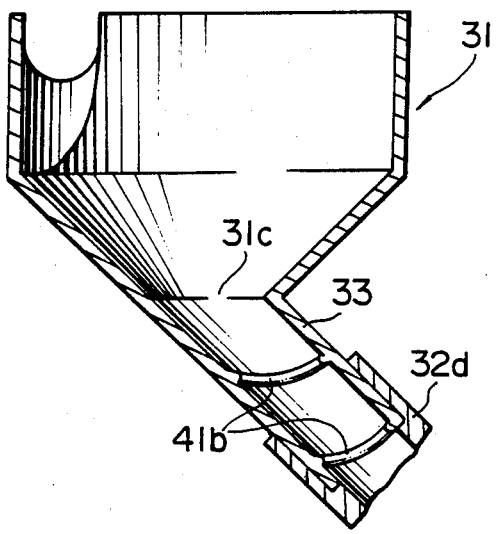
FIG. 5 is a vertical sectional view of another modified communication path of the beverage extracting apparatus shown in FIG. 2.

In this communication path, a spirally extending groove 41a can be formed on the inner surface of the communication path as shown in FIG. 4 or a spirally extending projection 41b can be provided on the inner surface as shown in FIG. 5 to reinforce the vortex flow of the mixture liquid.

The mixture liquid flows into cylinder 32 from inflow port 32d through the clearance between spherical inner surface 32c of the cylinder and spherical upper surface 34c of valve 34 and flows downwardly along the inner side surface of side wall 32a of the cylinder, as shown by the arrows in FIG. 2. Since upper inner surface 32c of cylinder 32 and upper surface 34c of valve 34 are formed a spherical surfaces, the mixture liquid flows smoothly down and does not remain on the surfaces, thereby maintaining these surfaces sanitary. Further, the mixture liquid flows into the mixture liquid in cylinder 32 at the position near side wall 32a of the cylinder, and thereafter, flows towards the center of the mixture liquid and flows upwardly in the mixture liquid, as shown by the arrows in FIG. 2. Therefore, a vertical convective flow is generated in the mixture liquid in cylinder 32, and the mixture liquid is naturally and efficiently stirred by the convective flow, thereby significantly shortening the time for the stirring in the cylinder.

After the mixture liquid flows into cylinder 32, valve 34 closes inflow port 32d of the cylinder by driving valve drive mechanism 36. Thereafter, air pump 37a is driven, the pressurized air generated by the air pump is introduced into cylinder 32 through air pipe 37b and the hollow portion of valve shaft 35. Since valve shaft 35 also functions as a part of the air supply path and there is no air inlet port on side wall 32a of cylinder 32, the mixture liquid in the cylinder does not flow into the air supply path. It is thus not necessary to provide a check valve on the air supply path, thereby simplifying the structure of the air supply path and reducing the production costs.

Figure 6:
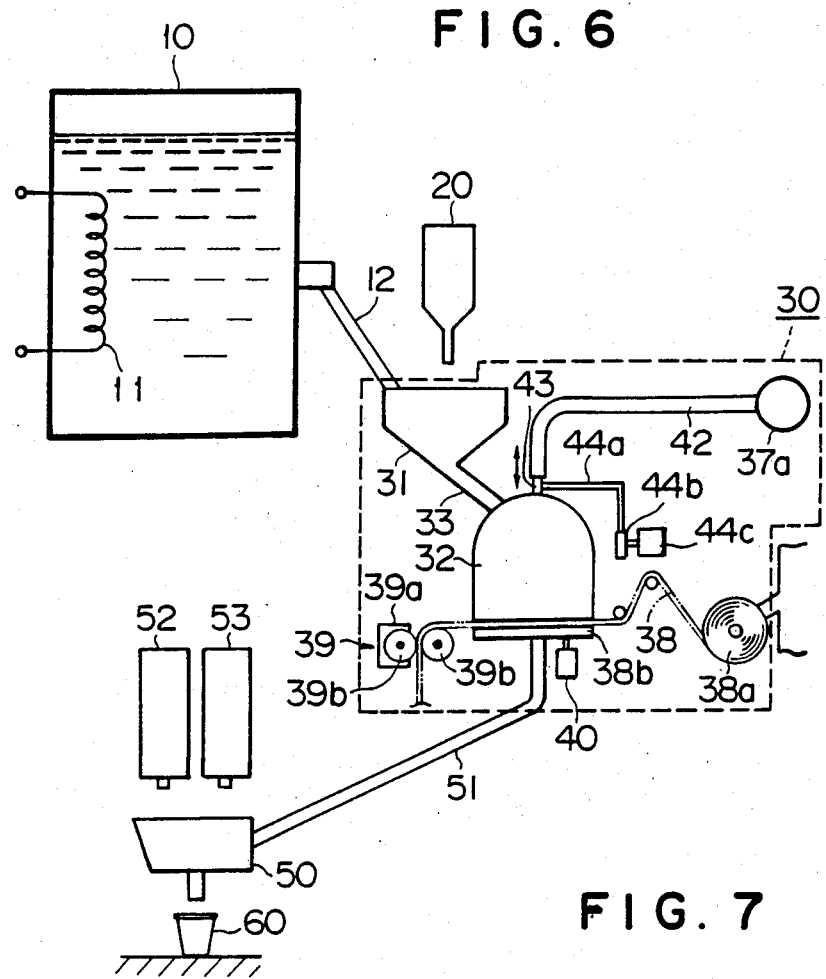
FIG. 6 is a schematic view of a vending machine including a beverage extracting apparatus according to another embodiment of the present invention.
Figure 7:
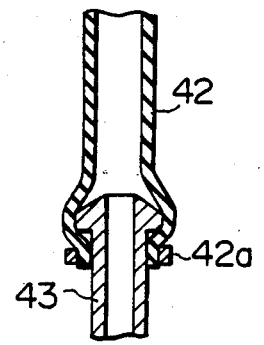
FIG. 7 is an enlarged vertical sectional view of a joint portion of a valve shaft and an air pipe of the beverage extracting apparatus shown in FIG. 6.

Pressurization means 37 and valve drive mechanism 36 may be modified as shown in FIG. 6. In this embodiment, an air pipe 42 comprises a flexible pipe with an easy connection thereof to a valve shaft 43. Air pipe 42 is connected to the top end portion of valve shaft 43 via an attachment 42a for sealing as shown in FIG. 7. Valve shaft 43 is connected to an arm 44a, and the arm is driven by a can 44b rotated by a motor 44c for vertically driving the valve shaft. Other components of FIG. 6 are substantially the same as those of FIG. 1.

Figure 8:
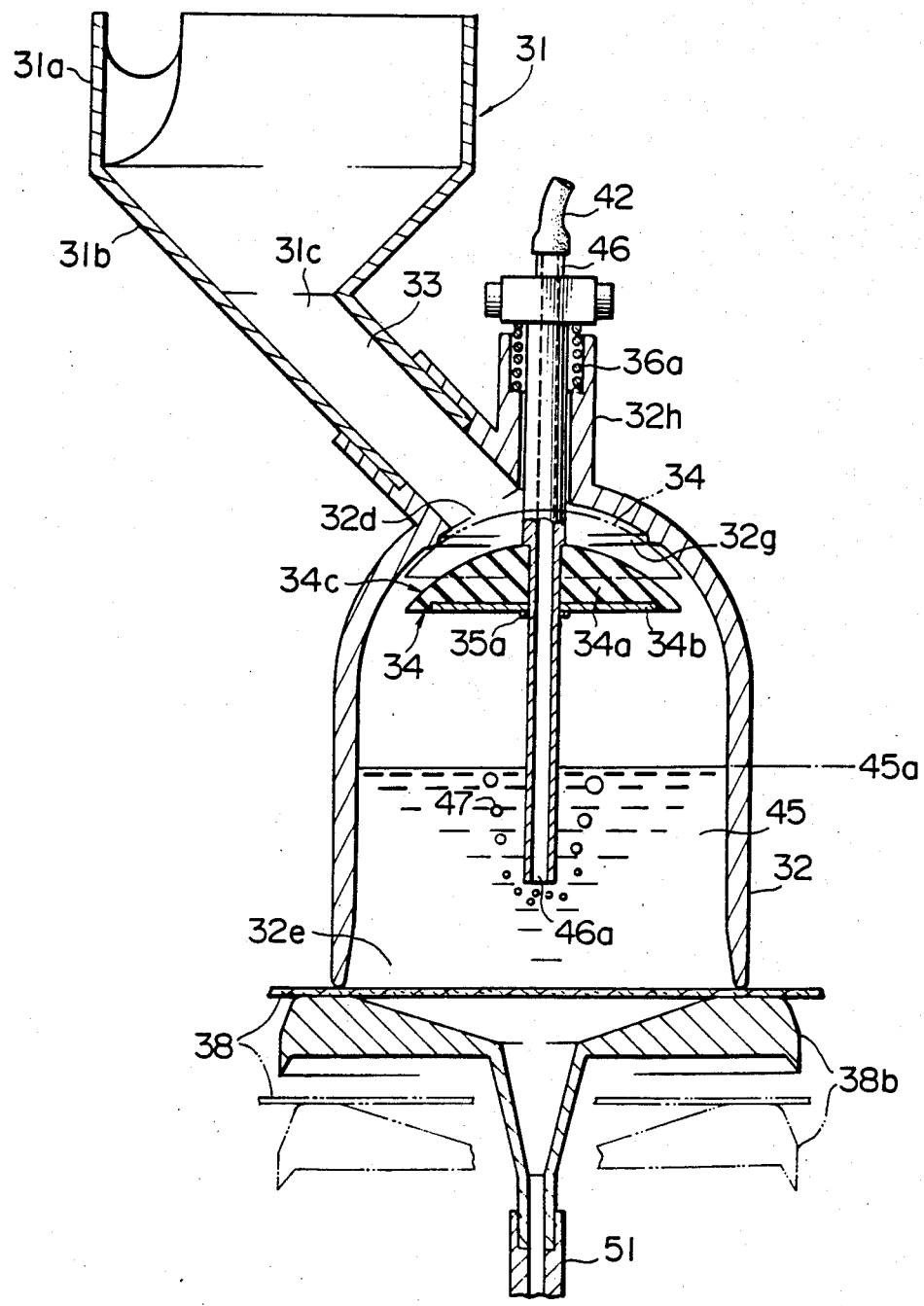
FIG. 8 is a vertical sectional view of a beverage extracting apparatus for vending machines according to a further embodiment of the present invention.

The valve shaft may extend down to a position below liquid level 45a of mixture liquid 45 stored in cylinder 32 as shown in FIG. 8. In this embodiment, the pressurized air is supplied into cylinder 32 through a valve shaft 46 from a bottom opening 46a of the valve shaft. Valve shaft 46 is positioned on the axis of cylinder 32. The pressurized air supplied from bottom opening 46a forms bubbles 47 in the mixture liquid stored in cylinder 32, and the bubbles rise in the mixture liquid and thereby stir it. Since the bubbles 47 rise in the mixture liquid in its central portion, all of the mixture liquid is efficiently stirred, thereby shortening the stirring time needed. Since the bubbles 47 which have reached liquid level 45a break at positions spaced from the inner side surface of side wall 32a of cylinder 32, the mixture liquid scattered by the bubbles breaking does not impact and stick to the inner side surface, thereby maintaining the surface sanitary. Moreover, even though the mixture liquid having a vortex flow and sent from mixing ball 31 into cylinder 32 is maintained in this swirling state even in the cylinder, and in such a state, the raw powder in the mixture liquid tends to collect at the central portion of the cylinder, the bubbles 47 can efficiently stir the collected raw powder.

Figure 9:
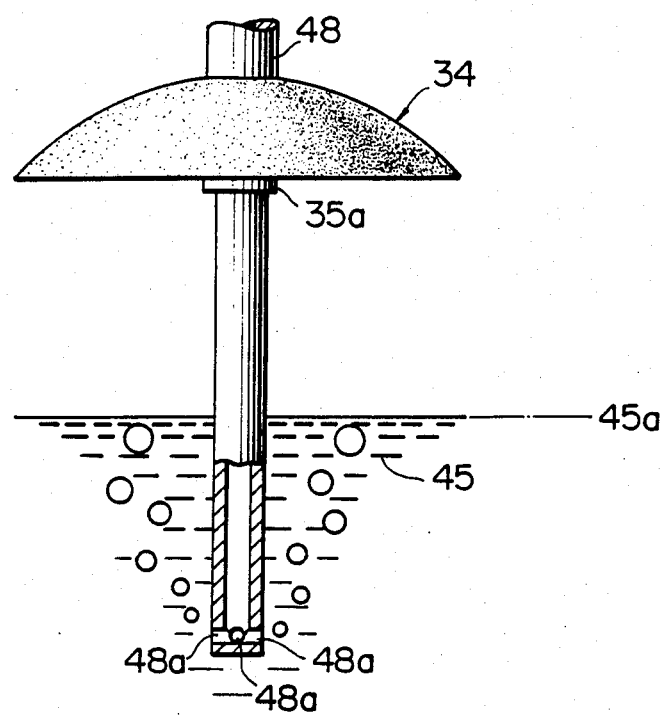
FIG. 9 is a vertical sectional view of a portion of a beverage extracting apparatus showing a modification of the apparatus shown in FIG. 8.
Figure 10:
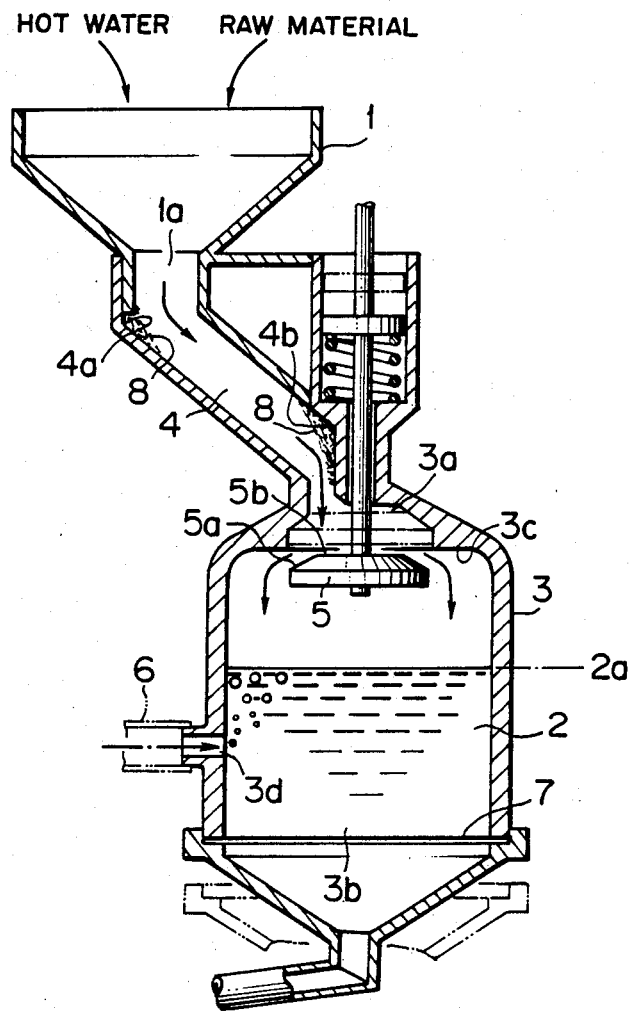
FIG. 10 is a vertical sectional view of a conventional beverage extracting apparatus for vending machines.

In this embodiment, the bottom opening of the valve shaft may be modified as shown in FIG. 9. In this modification, a plurality of openings 48a are provided on the periphery of the lower portion of a valve shaft 48, and the openings are arranged at an appropriate distance in the circumferential direction of the valve shaft. Since the pressurized air is discharged radially from openings 48a into the mixture liquid, the mixture liquid can be stirred more uniformly.

By supplying the pressurized air into cylinder 32, the mixture liquid remaining in the cylinder is forcibly filtered via filter 38 and the filtered mixture liquid is extracted from the cylinder to mixing box 50 through the inside space of filter block 38b and extracted liquid delivering pipe 51. Thereafter, the sugar and the cream are added to the mixture liquid in mixing box 50 from sugar box 52 and cream box 53 as required, and the completed liquid as ordered with sugar and/or cream or without sugar and cream is poured into cup 60 as the beverage to be sold to the customer.

Although the mixture liquid is made from hot water and raw powder (for example, coffee powder) in the above embodiments, a mixture liquid may be made from water having any temperature (for example, cold water) and a raw material having any formation or composition.

Although several preferred embodiments of the present invention have been described herein in detail, it will be appreciated by those skilled in the art that various modifications and alterations can be made to these embodiments without materially departing from the novel teachings and advantages of this invention. Accordingly, it is to be understood that all such modifications and alterations are included within the scope of this invention as defined by the following claims.

What is claimed is:

1. A beverage brewing apparatus, comprising:
   mixing chamber means for mixing a liquid and a beverage material to make a beverage liquid, said mixing chamber means having an outflow port through which the beverage liquid is discharged, said mixing chamber means having a chamber side;
   a lower chamber positioned generally below said mixing chamber means, said lower chamber having an inlet port through which beverage liquid passes from said mixing chamber means into said lower chamber, said lower chamber having a bottom opening;
   a straight cylindrical pipe communicating said outflow port and said inlet port, extending along a straight line therebetween, and through which the beverage liquid passes from said mixing chamber means to said lower chamber, said pipe having an upper straight line extension thereof defining said chamber side and a lower straight line extension intersecting an upper surface of said lower chamber and defining a corner therewith;
   valve means for opening and closing said inlet port;
   a filter covering said bottom opening; and
   supplying means for supplying pressurized gas into said lower chamber, when said inlet port is closed by said valve means, and forcibly filtering beverage liquid in said lower chamber through said filter.

2. The apparatus of claim 1 wherein the liquid is water, and further comprising supplying means for supplying the water tangentially into said mixing chamber means.

3. The apparatus of claim 1 wherein said pipe has an inner pipe surface and a spiral groove on said inner pipe surface.

4. The apparatus of claim 1 wherein said pipe has an inner pipe surface and a spiral projection on said inner pipe surface.

5. The apparatus of claim 1 wherein the liquid is hot water, and further comprising supplying means for supplying the hot water to said mixing chamber means.

6. The apparatus of claim 1 wherein the beverage material is a raw dry powder and said mixing chamber means includes an upper inlet for the raw dry powder.

7. The apparatus of claim 1 wherein said lower chamber is cylindrically shaped.

8. The apparatus of claim 1 further comprising stirring means for stirring the beverage liquid in said pipe.

9. A beverage brewing apparatus, comprising:
   mixing chamber means for mixing a liquid and a beverage material to make a beverage liquid;
   a lower chamber positioned generally below said mixing chamber means, said lower chamber having an inlet port in through which beverage liquid passes from said mixing chamber means, a bottom opening, and an upper, inner spherical surface;
   valve means for opening and closing said inlet port, said valve means having a valve spherical surface extending along said spherical surface of said lower chamber;
   a filter covering said bottom opening; and
   supplying means for supplying pressurized gas into said lower chamber, when said inlet port is closed by said valve means, and forcibly filtering beverage liquid in said lower chamber through said filter.

10. The apparatus of claim 9 wherein said valve means includes a rubber body member forming said valve spherical surface.

11. The apparatus of claim 9 wherein said valve spherical surface is constructed from rubber.

12. The apparatus of claim 9 wherein said lower chamber includes a valve seat on said spherical surface of said lower chamber.

13. The apparatus of claim 12 wherein said lower chamber is shaped as a cylinder and said valve seat extends in the circumferential direction of the cylinder.

14. The apparatus of claim 9 wherein said lower chamber is cylindrically shaped.

15. The apparatus of claim 9 wherein the liquid is hot water, and further comprising supplying means for supplying the hot water to said mixing chamber means.

16. The apparatus of claim 9 wherein the beverage material is a raw dry powder and said mixing chamber means includes an upper inlet for the raw dry powder.

17. A beverage brewing apparatus, comprising:
    mixing chamber means for mixing a liquid and a beverage material to make a beverage liquid;
    a lower chamber positioned generally below said mixing chamber means, said lower chamber having an inlet port through which beverage liquid passes from said mixing chamber means into said lower chamber and a bottom opening;
    valve means for opening and closing said inlet port;
    a valve pipe shaft connected to and extending vertically through said valve means;
    drive means for driving said valve means by way of said valve pipe shaft;
    a filter covering said bottom opening; and
    supplying means for supplying pressurized gas into said lower chamber, when said inlet port is closed by said valve means, and forcibly filtering beverage liquid in said lower chamber through said filter;
    wherein said supplying means supplies the pressurized gas through an air path into said lower chamber and said valve pipe shaft defines a portion of the air path.

18. The apparatus of claim 17 wherein said valve pipe shaft extends down to a position spaced above the level of the beverage liquid in said lower chamber.

19. The apparatus of claim 17 wherein said valve pipe shaft extends down to a position below the level of the beverage liquid in said lower chamber.

20. The apparatus of claim 17 wherein said lower chamber is cylindrically shaped and has a cylinder axis and said valve pipe shaft is positioned on the cylinder axis.

21. The apparatus of claim 17 wherein said drive means comprises a cam mechanism.

22. The apparatus of claim 17 wherein said lower chamber is cylindrically shaped, the liquid is hot water, and the beverage material is a raw dry powder.

* * * * *